United States Patent
May et al.

(10) Patent No.: US 6,752,251 B2
(45) Date of Patent: Jun. 22, 2004

(54) ELECTRONICALLY CONTROLLED VISCOUS FAN DRIVE

(75) Inventors: James P. May, Jackson, MI (US); Neil E. Robb, Jackson, MI (US); Darin L. Gwin, Marshall, MI (US)

(73) Assignee: BorgWarner, Inc., Auburn Hills, MI (US)

(*) Notice: Subject to any disclaimer, the term of this patent is extended or adjusted under 35 U.S.C. 154(b) by 0 days.

(21) Appl. No.: 10/287,325

(22) Filed: Nov. 4, 2002

(65) Prior Publication Data

US 2004/0084273 A1 May 6, 2004

(51) Int. Cl.⁷ ............................................... F16D 35/02
(52) U.S. Cl. ................................. 192/58.61; 192/58.8
(58) Field of Search ........................... 192/58.61, 58.63, 192/58.8, 82 T (56) References Cited

U.S. PATENT DOCUMENTS

| | | | |
|---|---|---|---|
| 4,190,140 A | | 2/1980 | Konkle et al. |
| 4,310,085 A | * | 1/1982 | LaFlame .................. 192/58.61 |
| 4,362,226 A | * | 12/1982 | Gee ........................ 192/58.61 |
| 4,828,088 A | * | 5/1989 | Mohan et al. ............ 192/58.62 |
| 5,113,987 A | * | 5/1992 | Drennen et al. ........... 192/58.7 |
| 5,452,782 A | * | 9/1995 | Inoue ...................... 192/58.63 |
| 5,555,963 A | | 9/1996 | Martin |
| 5,558,192 A | | 9/1996 | Mühlbach et al. |
| 5,816,376 A | | 10/1998 | Hatori |
| 5,893,442 A | | 4/1999 | Light |
| 6,021,747 A | * | 2/2000 | Gee et al. ................. 123/41.12 |
| 6,026,943 A | | 2/2000 | Fuchs et al. |
| 6,056,098 A | * | 5/2000 | Brown et al. ............ 192/58.61 |
| 6,085,881 A | | 7/2000 | Robb |
| 6,305,519 B1 | | 10/2001 | Katoh et al. |
| 6,419,064 B1 | | 7/2002 | Krammer |

* cited by examiner

Primary Examiner—Richard M. Lorence
(74) Attorney, Agent, or Firm—Artz & Artz, P.C.; Greg Dziegielewski (57) ABSTRACT

An electronically-controlled viscous fan drive having a one-piece accumulator and reservoir located on the top side of the clutch. The accumulator also has a low pressure and high pressure fill hole for allowing movement of viscous fluid from the reservoir to a anti-bleedback chamber and into the operating and working chamber of the coupling during normal operation. A radially balance valve disk having a step up feature coupled to a spring and an actuator electronically controls movement of viscous fluid from the reservoir to the anti-bleedback chamber through the fill holes by energizing or deenergizing the spring based on engine operating conditions. The valve disk may be a one-piece or two-piece design. The accumulator is designed to prevent morning sickness associated with the flow of viscous fluid from the reservoir to the operating chamber during engine off situations.

28 Claims, 6 Drawing Sheets

ELECTRONICALLY CONTROLLED VISCOUS FAN DRIVE

TECHNICAL FIELD

The invention relates generally to fan drive systems and more specifically to an electronically controlled viscous fan drive.

BACKGROUND ART

The present invention relates to fluid coupling devices of the type including both fluid operating chamber and a fluid reservoir chamber, and valving which controls the quantity of fluid in the operating chamber.

Although the present invention may be used advantageously in fluid coupling devices having various configurations and applications, it is especially advantageous in a coupling device of the type used to drive a radiator cooling fan of an internal combustion engine, and will be described in connection therewith.

Fluid coupling devices ("fan drives") of the viscous shear type have been popular for many years for driving engine cooling fans, primarily because their use results in substantial saving of engine horsepower. The typical fluid coupling device operates in the engaged, relatively higher speed condition only when cooling is needed, and operates in a disengaged, relatively lower speed condition when little or no cooling is required.

For many years, one of the problems associated with fluid coupling devices used to drive radiator cooling fans has been the phenomenon known as "morning sickness". A typical viscous fan drive includes one or more fill openings, through which viscous fluid flows from the reservoir into the operating chamber, and one or more discharge openings through which fluid is pumped from the operating chamber back into the reservoir. After the fan drive has been operating for a period of time, and the engine is turned off, the fan drive ceases rotation. When the fan drive stops rotating, the orientation of the fill and discharge openings is completely unpredictable, i.e., the fill opening could be in the three o'clock position and the discharge opening could be in the nine o'clock position, in which case there would probably be relatively little "drain back" or "bleed back", i.e., a flow of fluid from the reservoir back into the operating chamber.

However, the fan drive could stop with the discharge opening in the six o'clock position and the fill opening in the twelve o'clock position, in which case the discharge opening would be beneath the level of fluid in the reservoir. When this situation occurs, it has been conventional for a certain amount of fluid to bleed back from the reservoir through the discharge opening, into the operating chamber. Then, when the operation of the fan would begin again, after a long period of time (for example, the next morning), with a substantial amount of fluid in the operating chamber, even though the engine was cold and no cooling was required, the fan drive would initially operate in the engaged condition for a period of time until most of the fluid in the operating chamber is pumped back into the reservoir. Unfortunately, such engaged operation results in an undesirable noise of the fan being driven when it is not required. It is this phenomenon, most common and perhaps most objectionable in the morning, which has been referred to as "morning sickness".

Several substantial improvements to overcome the problem of morning sickness have been developed by the assignee of the present invention, such solutions being described and illustrated in U.S. Pat. Nos. 4,312,433 and 5,101,950, both of which are assigned to the assignee of the present invention and incorporated herein. In both of the cited patents, the general approach to the problem of morning sickness has been to configure the discharge flow path (i.e., the path from the operating chamber, past the pump out means and back to the reservoir) such that fluid in the reservoir would be unable to flow backwards through the discharge path and into the operating chamber, regardless of the rotational orientation of the fan drive during periods of engine shut down.

Unfortunately, it has been observed that, even in the presence of anti-bleed back solutions in the above-cited patents, a certain amount of bleed back or drain back can still occur through the fill opening whenever, for example, the fan drive stops rotating with the fill opening is in the six o'clock position (i.e., below the fluid level) and the discharge opening in the twelve o'clock position. As is well known to those of skill in the art, the fill hole needs to be near the radially outer periphery of the reservoir chamber, in order to facilitate filling of the operating chamber, but then, the fill hole is even more likely to be well below the fluid level in the reservoir chamber. The bleed back through the fill opening can occur in one of three ways. First, if, as a result of manufacturing inaccuracies or otherwise, the valve arm does not seal tightly over the fill opening, bleed back will occur. Second, if the ambient air temperature around the fan drive is relatively high when the fan drive stops rotating, the valve arm will open (or remain open) and allow fluid to flow from the reservoir into the operating chamber. Third, an electronically controlled fan drive this is of the "fail-safe ON" type will have its valve opened when the electrical power is turned off.

One method for eliminating morning sickness is described in U.S. Pat. No. 6,085,881, which is assigned to the assignee of the present invention and incorporated herein. In this cited patent, an accumulator plate is provided that is attached to the cover and defines an accumulator chamber within the operating chamber. When the engine is turned off, any fluid draining from the reservoir back through the fill hole is contained within the accumulator chamber and prevented from flowing directly into the viscous shear chamber. After the engine is started, fluid flows back from the accumulator chamber and fills the shear chamber in the normal manner.

However, the weakness with this design is that an accumulator plate is need to close the accumulator and reservoir. This is a potential leakage point. Further, the location of the accumulator requires back side machining that adds to the cost of the fan drive.

It is thus highly desirable to provide a viscous shear plate that further eliminates leakage points and eliminates costly machining.

SUMMARY OF THE INVENTION

The present invention addresses some of the issues described above by providing an electronically controlled viscous fan drive system having a one-piece accumulator and reservoir located on the top side of the clutch. The accumulator also has a low pressure and high pressure fill hole for allowing movement of viscous fluid from the reservoir to a antibleedback chamber and into the operating and working chamber of the coupling during normal operation. A radially balance valve disk having a step up feature coupled to a spring and an actuator electronically controls movement of viscous fluid from the reservoir to the antibleedback chamber through the fill holes by energizing or deenergizing the spring based on engine operating conditions. The step up feature of the valve disk allows a more controlled flow of viscous fluid by allowing the opening of the low pressure and high pressure fill holes separately as a function of valve disk positioning. For example, the actuator may be electronically activated to pull the spring downward, thereby closing the high pressure and/or low pressure fill holes to prevent viscous fluid movement to the operating chamber, during engine on conditions when engine operating conditions require no clutch engagement (i.e. no cooling required from the viscous fan drive).

In addition, by biasing the valve disk to allow viscous fluid to pass through the low pressure and high pressure fill holes during engine on conditions and no electrical activation, the present invention is failsafe to prevent damage to engine components if there is malfunctioning of the actuator or a loss of electrical power to the actuator.

The antibleedback chamber in the accumulator also prevents morning sickness in the fluid coupling device regardless of the positioning of the accumulator when the engine is turned off.

Other features, benefits and advantages of the present invention will become apparent from the following description of the invention, when viewed in accordance with the attached drawings and appended claims.

BEST MODES(S) FOR CARRYING OUT THE INVENTION

Figure 1:
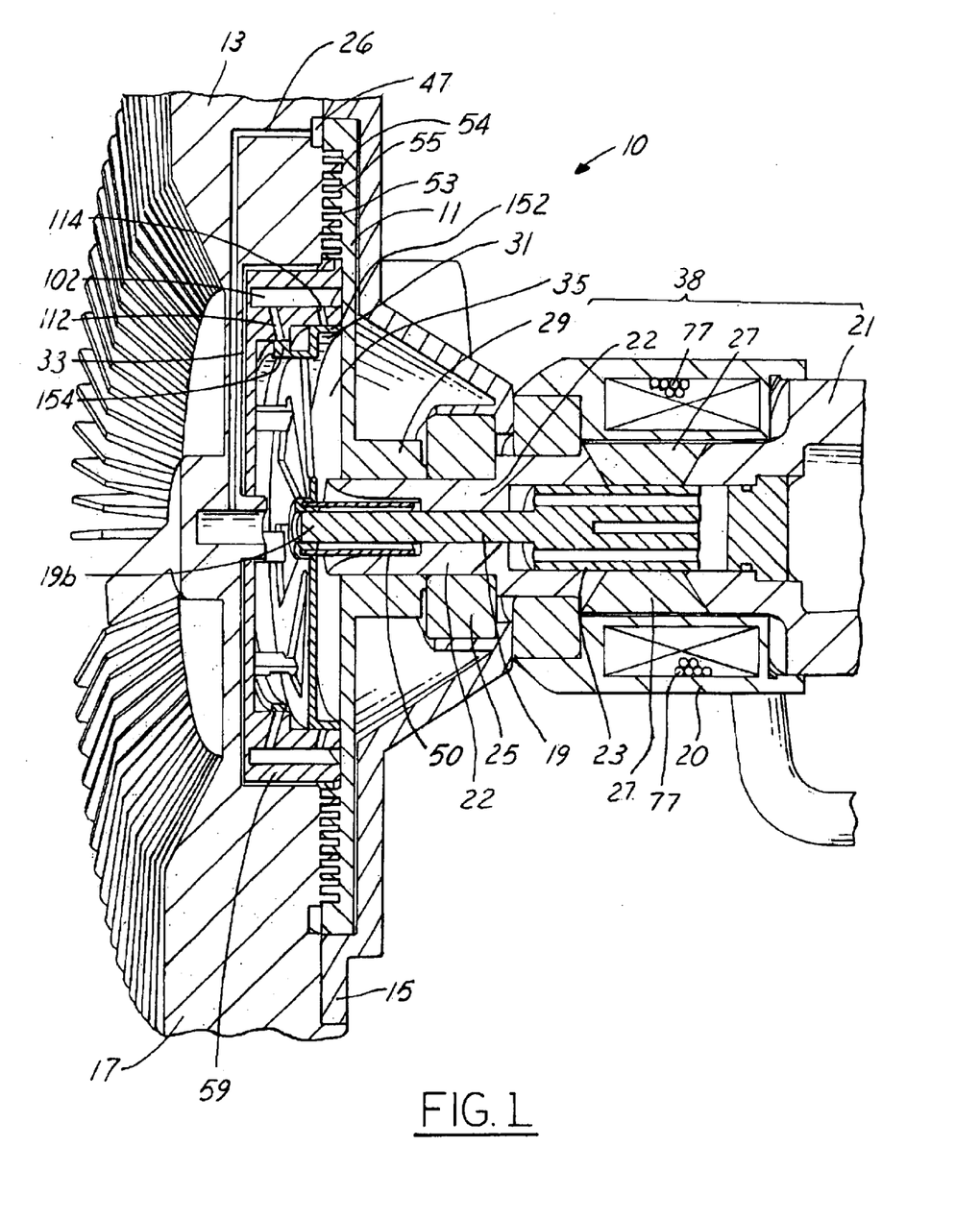
FIG. 1 is a perspective view of a fluid coupling device according to one preferred embodiment of the present invention in the disengaged position.

Referring now to the drawings, which are not intended to limit the invention, FIG. 1 illustrates one preferred form of a fluid coupling device 10 ("viscous fan drive") of a type utilizing the present invention. The fluid coupling device of FIG. 1 includes an input coupling member generally designated 11, and an output coupling assembly, generally designated 13. The assembly 13 includes a die cast housing member (body) 15, and a die cast cover member (enclosure) 17, the members 15 and 17 being secured together by a rollover of the outer periphery of the cover member 17, as is well known in the art. It should be understood that the present invention is not limited to use with a cast cover member, but may also be used in a viscous fan drive of the type including a stamped cover member.

The fluid coupling device 10 is adapted to be driven by a liquid cooled engine, and in turn, drives a radiator cooling fan, neither of which are shown herein. The fan may be attached to the housing member 15 by any suitable means, such as is generally well known in the art, and as is illustrated in the above-incorporated patents. It should be understood, however, that the use of the present invention is not limited to any particular configuration of fluid coupling device, or fan mounting arrangement, or any particular application for the fan drive, except as is specifically noted hereinafter. For example, the present invention could be used with a fan drive of the type adapted to have the radiator cooling fan attached to the cover member, rather than to the body member.

Figure 2:
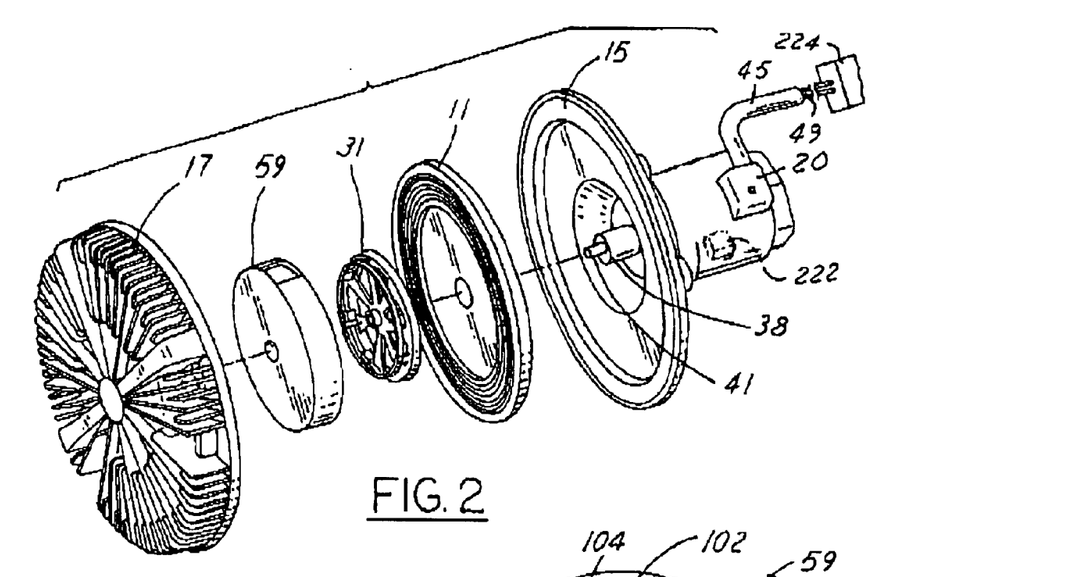
FIG. 2 is an exploded view of FIG. 1.

The coupling device 10 includes an input coupling assembly 38 on which the input coupling member 11, or clutch, is mounted. The input coupling assembly 38 is rotatably driven, such as by means of an hexagonal, internally threaded portion 21, which would typically be threaded onto an externally threaded shaft extending from the engine water pump. The input coupling assembly 38 also has stainless steel, trapezoidal shaped piece 27 and a nose end portion 22, in which the piece 27 is preferably friction welded to and between the threaded portion 21 and a nose end portion). In other embodiments, the piece 27 could be brazed or simply welded to and between the threaded portion 21 and the nose end portion 27. The assembly 38 functions as a support for the inner race of a bearing set 25, which is seated on the inside diameter of the housing member 15. The forward end (left end in FIG. 1) of the actuator shaft 19 has an interference fit between the nose portion 22 and an opening defined by a hub portion 29 of the input coupling member 11. As a result, rotation of the assembly 38 causes rotation of the actuator shaft 19 and input coupling member 11. An actuator piston 23 is also coupled to a portion of the actuator shaft 19, therein forming an actuator shaft assembly 41 (shown best on FIG. 2).

The housing member 15 and the cover member 17 cooperate to define a fluid chamber, which is separated by means of a substantially circular valve disk 31 and accumulator 59, into a fluid operating chamber 33 and a fluid reservoir chamber 35. The valve plate 31 is operatively coupled with the innermost end 19b (left end of FIG. 1) of the actuator shaft 19. As shown in FIG. 1, the fluid reservoir chamber 35 is defined by the cover member 17 and accumulator 59, while the fluid operating chamber 33 is defined by the accumulator 59 and housing member 15. It may also be seen that the valve disk 31 is disposed within the accumulator 59 and the input coupling member 11. The relative positioning of the valve disk 31 with respect to the accumulator 59, as controlled by a return spring 50 coupled to the valve disk 31 that is biased or unbiased by an actuator piston 23 magnetically driven by the actuator 20 is a key aspect of the present invention and is used to control the amount of a viscous fluid (not shown) contained in the operating chamber 33 and reservoir chamber 35, respectively and will be discussed in detail further below.

Disposed adjacent the radially outer periphery of the operating chamber 33, the cover member 17 includes a pumping element 47, also referred to as a "wiper" element, operable to engage the relatively rotating fluid in the operating chamber 33, and generate a localized region of relatively higher fluid pressure. As a result, the pumping element 47 continually pumps a small quantity of fluid from the operating chamber 33 back into the reservoir chamber 35 through a radial passage 26 defined by the cover member 17, in a manner well known in the art.

In the subject embodiment of the invention, and by way of example only, the input coupling member 11 includes a forward surface which defines a plurality of annular lands 53. The adjacent surface of the cover member 17 forms a plurality of annular lands 55. The annular lands 53 and 55 are interdigitated to define a serpentine-shaped viscous shear space 54 therebetween. It is believed that in view of the above-incorporated U.S. Patents, those skilled in the art can fully understand the construction and operation of the fluid coupling device illustrated in FIG. 1, as well as the various flow paths for the viscous fluid. The anti-drain back structure of the present invention could also be used in fan drives in which the lands and grooves are formed between the input coupling member and the housing (body) member.

Figures 3, 4:
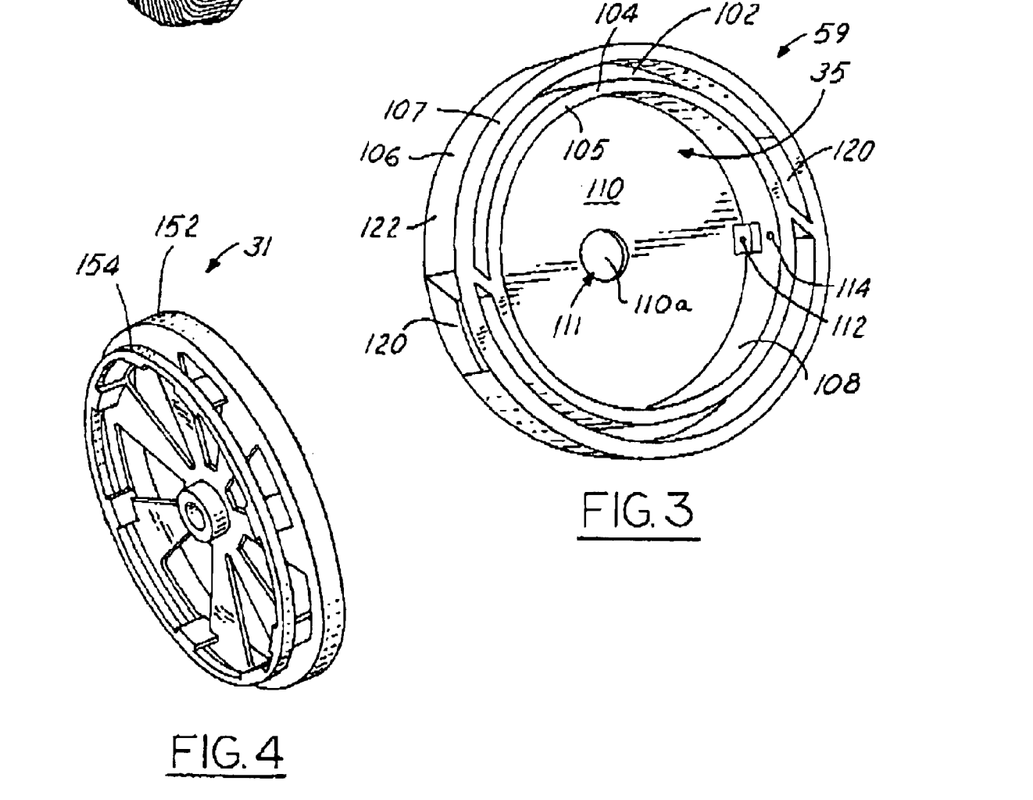
FIG. 3 is a side view of the accumulator of FIG. 2.
FIG. 4 is a side view of the circular valve disk of FIG. 2.

As can be best seen in FIG. 3, the accumulator 59 is preferably made of a molded plastic material and contains an anti-bleedback chamber 102 defined by an inner circular ring 104 and an outer circular ring 106 and by the input coupling member 11. The inner circular ring 104 has an inner top region 105. The inner circular ring 104 also has a low pressure fill hole 112 and a high pressure fill hole 114. Contained within an inner portion 108 of the inner circular ring 104 is a plate region 110. The plate region 110, inner portion 108, and input coupling member 11 define the reservoir chamber 35. The plate region 110 also has a central region 111 that contains an opening 111b for return of viscous fluid through the radial passage 26.

The outer circular ring 106 has a pair of open regions 120 that are in open communication with the operating chamber 33 and disposed inapposite of one another around the outer circumference 122 of the outer circular ring 106. The outer circular ring 106 has a top region 107. When coupled, the inner top region 105 and outer top region 107 substantially seal to the input coupling member 11, therein further defining the fluid reservoir chamber 35 and anti-bleedback chamber 102.

As shown in FIG. 4, the valve disk 31 has an outer step region 152 and an inner step region 154. The valve disk 31 is also preferably made of a molded plastic material. The step regions 152, 154 are used to regulate the amount of fluid pressure exiting through the fill holes 112, 114 of the accumulator 59 during operation of the coupling member 10 to control the rotation of the cover member 17.

As may be best seen in FIG. 1, when the coupling device 11 is rotating and in the disengaged position (i.e. with the low and high pressure fill holes 112, 114 are covered by the inner step region 154 and outer step region 152, respectively), substantially all of the viscous fluid in the device 10 is contained within the fluid reservoir chamber 35. In the disengaged position, no viscous fluid is contained within the annular lands 53, 55 to drive cover member 17.

To disengage the fan drive, as shown in FIG. 1, an external controller portion 222 of the actuator 20 (shown best in FIG. 2) activates the electrical coil 77, therein creating a magnetic flux through the input coupling assembly 38 within the viscous fan drive 10. The actuator 20 is electrically coupled to an outside power source (not shown) and external sensory control, through one or more sensor inputs 224, through electrical coupling 45 having electrical leads 49 in a method well known in the art. The actuator piston 23, which is metallic, reacts in response to the magnetic flux to axially move in a direction away from the spring 50 (to the right in FIG. 1). As the actuator shaft 19 (and actuator coupling assembly 38) and valve disk 31 are coupled to the actuator piston 23, they are pulled rightward as well, thereby causing the inner step region 154 to cover the low pressure fill hole 112 and the outer step region 152 to cover the high pressure fill hole 114, thereby preventing the movement of viscous fluid from the reservoir chamber 35 to the anti-bleedback chamber.

Figure 5:
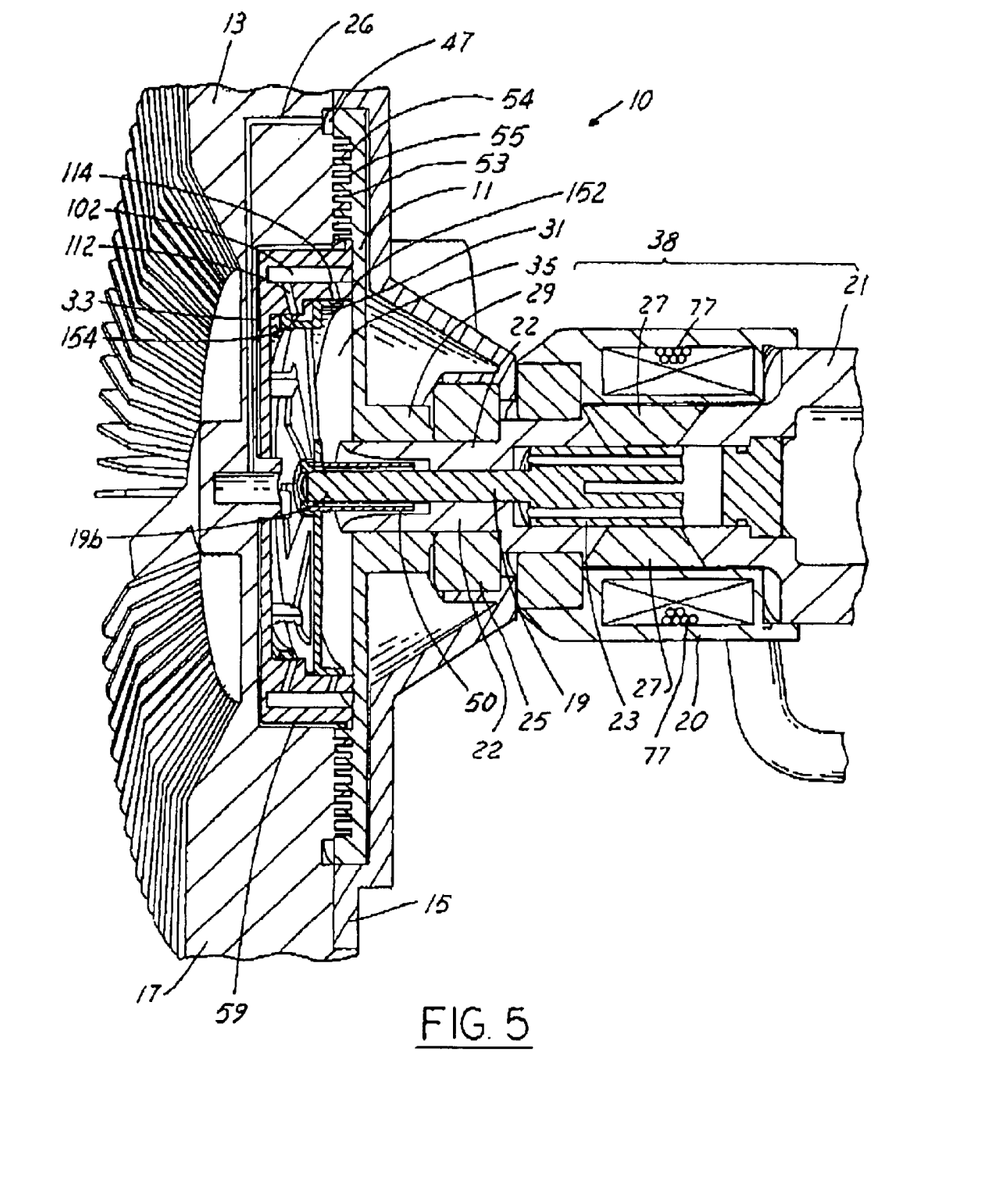
FIG. 5 is a perspective view of a fluid coupling device of FIG. 1 in a partially engaged position.

By decreasing the amount of power to the actuator 20, and hence magnetic flux available to move the actuator piston 23, as shown in FIG. 5, the spring 50 unbiases back towards its natural position, thereby pushing the valve disk 31 upward (to the left in FIG. 5). This pushes the inner step region 154 upward enough to uncover the low pressure hole 112 of the accumulator 59. This allows viscous fluid to enter the operating chamber 33. This viscous fluid then enters the working chamber 54 between the set of lands 53, 55. This causes slippage between the input coupling member 11 and the cover member 17, thereby driving the cover member 17 as a function of the input speed to the input coupling member 11 and as a function of the amount of viscous fluid contained in the working chamber 54, as is understood by those of ordinary skill in the art. This is the so-called partially engaged, or mid-speed position, as shown in FIG. 5.

Figure 6:
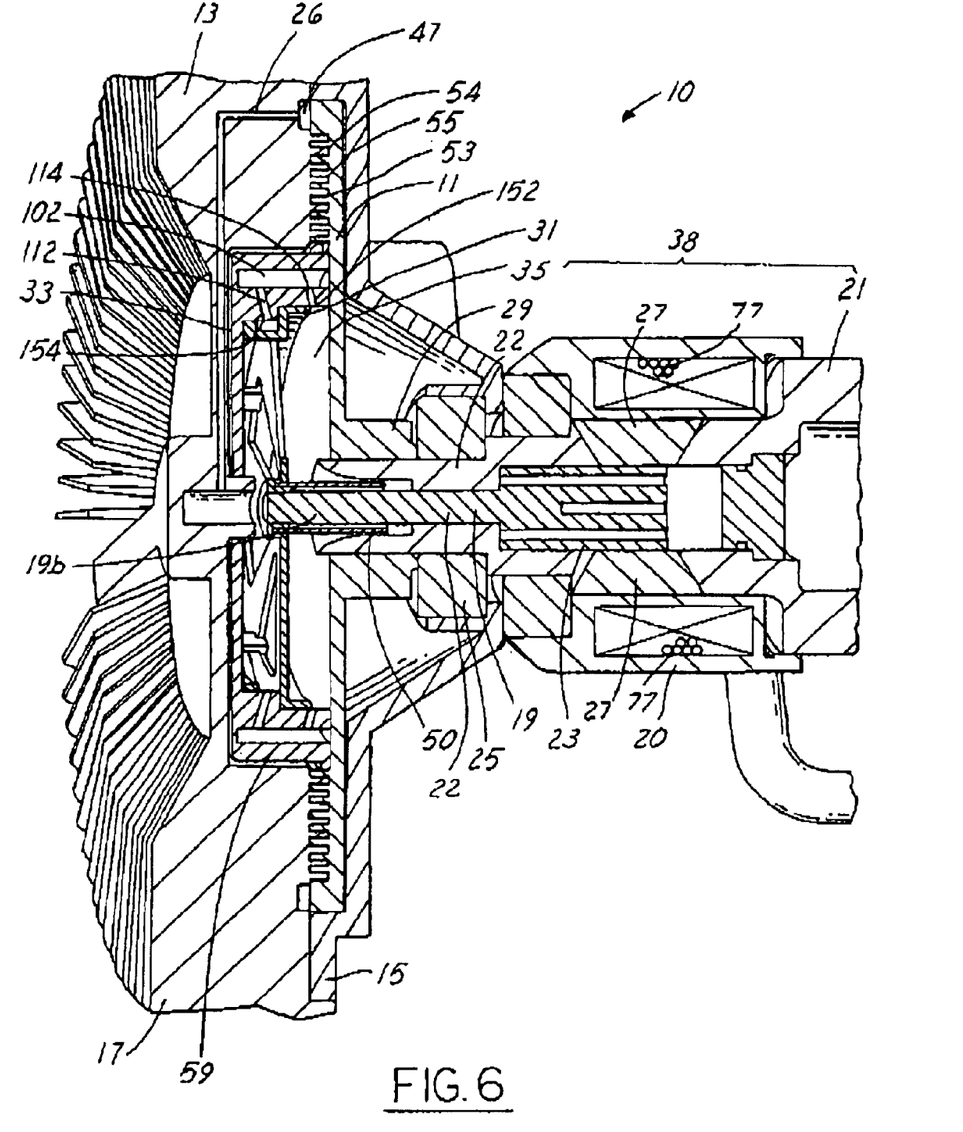
FIG. 6 is a perspective view of a fluid coupling device of FIG. 1 in a fully engaged position.

By turning off the power completely to the actuator 20, thereby removing the magnetic flux that drives the actuator piston 23 away from the spring 50, the return spring 50 pushes the valve disk 31, actuator shaft 19 and actuator piston 23 further upward, therein pushing the outer step region 152 upward enough to expose the high pressure fill hole 114 of the accumulator 59 into a fully engaged position. This is shown in FIG. 6. As one of ordinary skill appreciates, this allows the maximum amount of viscous fluid to enter the operating chamber 33 and working chamber 54, thereby allowing maximum slippage at input speed between the lands 53, 55 to rotate the cover member 17 at maximum speed. This is also known as the engaged position.

The amount of electrical power supplied in terms of pulse width modulation from the external controller and power source, and hence the amount of magnetic flux created to drive the actuator piston 23 rightward in response, is determined by the external controller. The controller receives a set of electrical inputs from various engine sensors (not shown) that monitor various engine operating conditions relating to engine temperature. For example, these sensors could be an engine mounted coolant sensor or a pressure sensor mounted to the air conditioner. When the controller determines that one or more of these sensors is sensing an engine operating conditions outside the desired range, the external controller and power source will send electrical power to the coil 77 as a function of this electrical signal. Thus, for example, if the external controller determines that the engine coolant temperature is too high, a signal may be sent from the controller to the actuator 20 activate the coil 77 to a desired pulse width, therein driving the actuator piston 23 and spring 50 to open the low pressure fill hole 112 or to open both the low pressure and high pressure fill holes 112, 114 in order to provide increased viscous fluid flow to the working chamber 54.

Similarly, if the external controller determines that the engine coolant temperature is below an undesired high range, a signal may be sent from the external controller to the coil 77 to provide maximum pulse width modulation to allow the inner and outer step regions 152, 154 to completely cover the low and high pressure fill holes 112, 114. In this scenario, no viscous fluid will enter the operating chamber 35 or working chamber 54 through the fill holes 112, 114, and the amount of slippage in the lands 53, 55 between the input coupling device 11 and cover member 17 to drive the cover member 17 will decrease to disengaged speed.

When the engine is turned off, and hence no magnetic flux is achieved to push the actuator piston 23, the return spring 50 will push the valve disk 31 upward to uncover both fill holes 112, 114. The configuration of the antibleedback chamber 102, however, prevents the viscous fluid from flowing back into the operating chamber 33 regardless of the final orientation of the accumulator 59. This is due to the fact both fill holes 112, 114, regardless of the final orientation of the accumulator 59, cannot be above the level of viscous fluid within the accumulator 59. Thus, the present invention solves the problem of morning sickness If, for example, the low pressure fill hole 112 is located at 6 o'clock and the high pressure fill hole 114 (or vice versa) is located at 12 o'clock, viscous fluid will drain through the low pressure fill hole and into the antibleedback chamber 102. However, the open region 120 associated with the antibleedback chamber 102 is at all times above the level of the viscous fluid within the chamber 102, thereby preventing the flow of viscous fluid into the operating chamber 33. The same scenario would be true for any orientation in which one fill hole 112, 114 is located below the level of the viscous fluid.

If, for example, the low pressure fill hole 112 is located at 3 and the high pressure fill hole 114 is located at 9 o'clock, then neither fill hole 112, 114 is covered with viscous fluid. Thus, all of the viscous fluid remains in the reservoir chamber 35.

In another scenario, where the power to the actuator 20 is cut off or wherein the actuator 20 malfunctions while the engine is still on, the viscous fan drive will be left in an engaged position, therein allowing the cover member 17 to rotate at maximum speed. This prevents engine damage associated with high temperatures.

Of course, as one of skill in the art appreciates, the actual amount of pulse width modulation necessary to energize the coil 77 is dependent upon many factors. For example, the size and shape of the spring 50 itself is a major factor is the amount of pulse width modulation necessary to move the actuator piston 23. A stiffer or larger spring 50 may require a larger pulse width to achieve a similar biasing of the spring 50 as compared with a more flexible or smaller spring.

Further, the size of the fill holes 112, 114 may affect the amount of biasing necessary. For example, an accumulator 59 with larger fill holes 112, 114 may only require the valve disk 31 to slightly uncover one or both of the fill holes 112, 114 in order to provide adequate viscous fluid flow to the working chamber.

Figure 7:
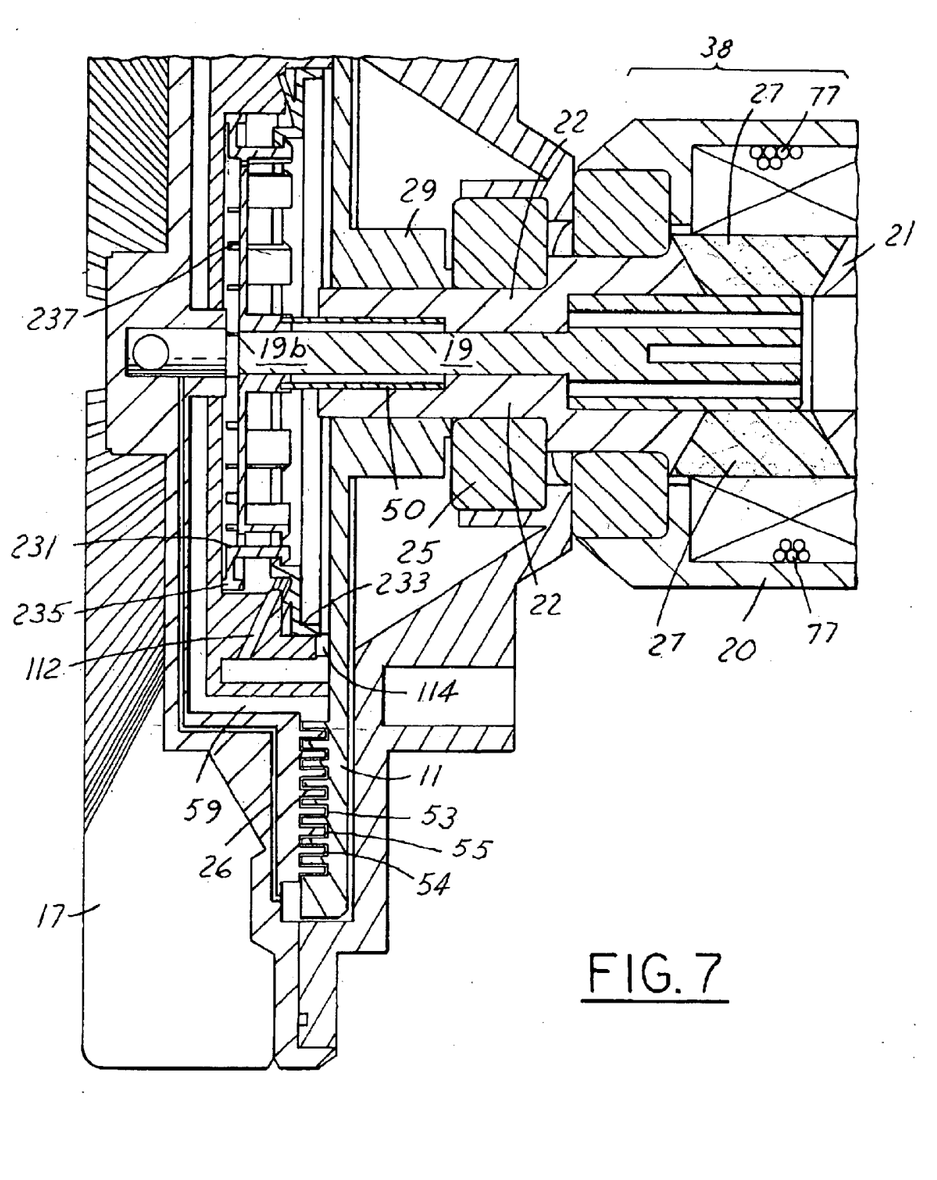
FIG. 7 is a perspective view of a fluid coupling device according to another preferred embodiment of the present invention in the disengaged position.
Figure 8:
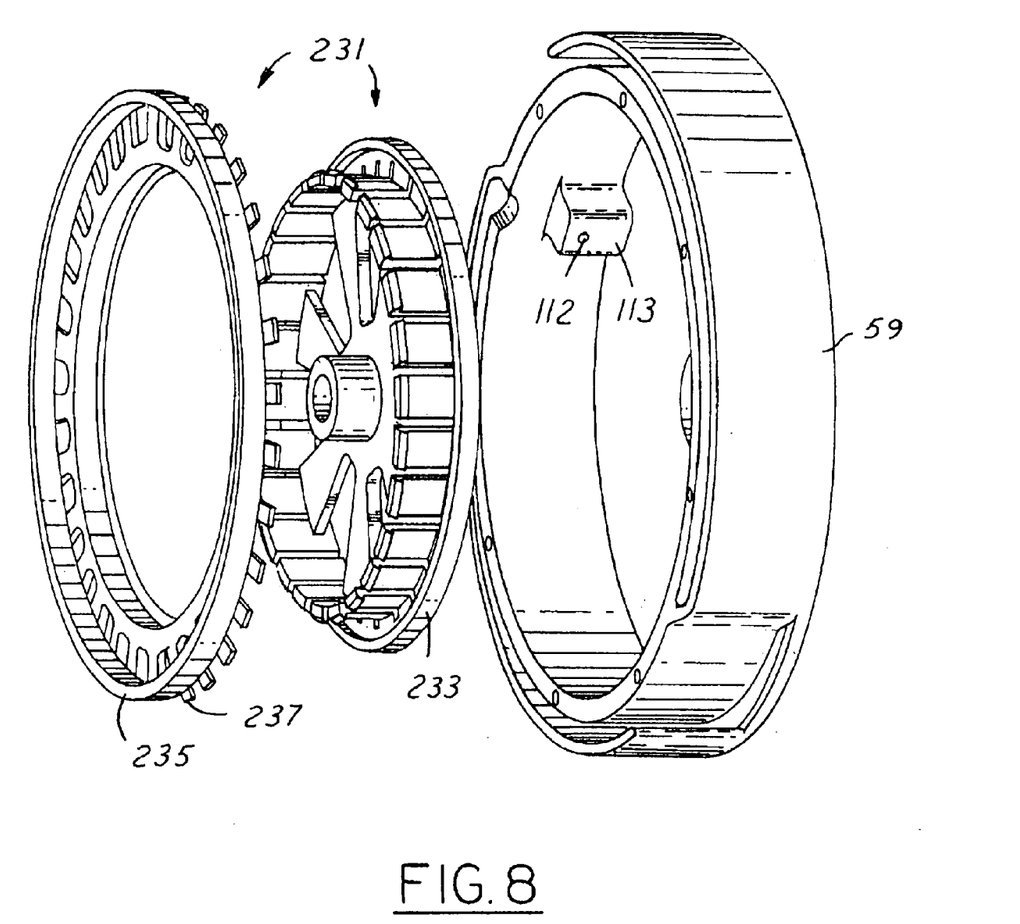
FIG. 8 is a side view of the two-piece circular valve disk of FIG. 7.

FIGS. 7 and 8 illustrate another preferred embodiment of the present invention, in which a two-piece valve disk 231 replaces the one-piece valve disk 31.

As shown best in FIG. 8, the two-piece valve disk 231 comprises an inner disk 233 and an outer disk 235. The inner disk 233 has a structure similar to the inner step region 154 of the valve disk 31 of FIGS. 1–6 and functions to cover or uncover the low pressure fill hole 112. The inner disk 233 is coupled to the spring member 50 and moves from a disengaged to partially engaged to engaged position in substantially the same manner and the inner step region 154 of the valve disk in FIGS. 1–6.

The outer disk 235 has a structure similar to the outer step region 152 and functions to cover or uncover the high pressure fill hole 114, which is now located closer to the input coupling member 11 as shown in FIG. 7. The outer disk 235 also contains a plurality of spring fingers 237 located on its outer periphery. Spring fingers 237 work against the low pressure fill hole step 113 (shown best in FIG. 8) holding the outer disk 235 in position covering the high pressure fill hole 114. The outer disk 235 only moves when the actuator 23 forces the inner disk 233 near the top of its travel towards the outer disk 235. The inner disk 233 then engages the spring fingers 237 of outer disk 235, thereby pushing the outer disk towards the actuator piston 23 to uncover the high pressure fill hole 114. As one of skill appreciates, the spring fingers 237 require additional force to move against it in order to move the outer disk 235 (i.e. there is play between the inner disk 233 the outer disk 237 before the inner disk 233 engages the outer disk 237 moves to uncover the high pressure fill hole 114. This is advantageous because small changes in ambient temperatures, and hence small changes in the amount of actuation (movement of the actuator piston 23) in the form of electrical excitation of the coils 77 will not significantly change the relative positioning of the outer disk 237 as compared to the change in relative positioning of outer step region 152 of FIGS. 1–6. Thus, the two-piece valve disk 231 may in fact be easier to control in covering and uncovering the fill holes 112, 114 than the one-piece disk 31.

The present invention offers many improvements over previous fluid coupling devices. First, the accumulator 59 is easily manufactured from a thermosetting molded material and offers a substantial cost savings. Also, no orientation of the valve disk 31, 231 is required, as the design will prevent morning sickness regardless of the valve disk 31, 231 positioning in engine off conditions. Third, pressure changes due to speed variations of the input coupling devices 11 are balanced or eliminated. Also, the present invention offers a shorter axial length than currently available reservoirs, thus allowing the fluid coupling device 10 to use less space in the engine compartment. Further, the present invention is instantaneously controllable by simply energizing or deenergizing the coil 77 to cover or uncover the high pressure and low pressure fill holes 112, 114, which allows for improved fuel economy. Also, the arrangement of the components is set in a failsafe engaged position, thereby protecting engine components by maintaining viscous fluid in the working chamber 54 during electrical outages or actuator 20 malfunctions.

While the invention has been described in connection with one embodiment, it will be understood that the invention is not limited to that embodiment. On the contrary, the invention covers all alternatives, modifications, and equivalents as may be included within the spirit and scope of the appended claims.

What is claimed is:

1. An electronically controlled viscous fan drive used on an internal combustion engine comprising:

an actuator capable of generating a magnetic flux;

a housing member;

a cover member coupled to said housing member;

an actuator shaft coupled to said actuator and partially disposed within said housing member and said cover member;

an input coupling assembly coupled to said actuator shaft, said input coupling assembly capable of rotating at an input speed;

an input coupling member coupled to said input coupling assembly and disposed within said housing member and said cover member, said input coupling member and said cover member defining a working chamber therebetween;

an accumulator coupled to said input coupling assembly and sealed to said input coupling member, said accumulator having an inner circular ring and an outer circular ring and a plate portion; said inner circular ring and said outer circular ring defining an anti-bleedback chamber, said anti-bleedback chamber having a pair of outer regions;

a fluid reservoir chamber defined by said inner circular ring, said plate portion, and said input coupling member, said fluid reservoir chamber in fluid communication with said working chamber;

a pumping element coupled between said working chamber and said fluid reservoir chamber through said cover member;

a fluid operating chamber defined by said accumulator, said cover member, and said input coupling member, said fluid operating chamber in fluid communication with said working chamber and each of said pair of outer regions;

a low pressure fill hole contained within said inner circular ring, said low pressure fill hole capable of moving a quantity of a viscous fluid from said reservoir chamber to said anti-bleedback chamber;

a high pressure fill hole contained within said inner circular ring, said high pressure fill hole capable of moving a quantity of said viscous fluid from said reservoir chamber to said anti-bleedback chamber;

a valve disk coupled to said actuator shaft and disposed within said fluid reservoir chamber, said valve disk having an inner step region and an outer step region;

an actuator piston coupled around a portion of said actuator shaft, said actuator piston capable of axial move met along the length of said input coupling assembly in response to said magnetic flux to position said valve disk in either an engaged position, a partially engaged position, or in a disengaged position; and a spring coupled to said actuator shaft and to said valve disk such that said spring is between said valve disk and said actuator piston, said spring normally biasing said valve disk in said engaged position in the absence of said magnetic flux of said actuator.

2. The fan drive of claim 1, wherein said accumulator comprises a molded plastic accumulator.

3. The fan drive of claim 1, wherein said engaged position is characterized such that said valve disk is positioned wherein said low pressure fill hole is not covered by said inner step region and wherein said high pressure fill hole is not covered by said outer step region.

4. The fan drive of claim 1, wherein said partially engaged position is characterized such that said low pressure fill hole is not covered by said inner step region and such that said high pressure fill hole is partially covered by said outer step region.

5. The fan drive of claim 1, wherein said partially engaged position is characterized such that said low pressure fill hole is not covered by said inner step region and such that said high pressure fill hole is covered by said outer step region.

6. The fan drive of claim 1, wherein said partially engaged position is characterized such that said low pressure fill hole is partially covered by said inner step region and such that said high pressure fill hole is covered by said outer step region.

7. The fan drive of claim 1, wherein said disengaged position is characterized such that said low pressure fill hole is covered by said inner step region and such that said high pressure fill hole is covered by said outer step region.

8. The fan drive of claim 1 further comprising:

an external controller; and an electrical coil electrically coupled to said external controller, said electrical coil capable of being electrically activated by said external controller to generate a magnetic flux, wherein a relative increase in amount of said magnetic flux thereby causing the movement of said actuator piston away from said spring in response to said relative increase and wherein a relative decrease in said amount of magnetic flux causes the movement of said actuator piston towards said spring in response to said relative decrease.

9. The fan drive of claim 8 further comprising at least one sensor input electrically coupled to said external controller, said at least one sensor input capable of sensing the temperature of the internal combustion engine, wherein said external controller interprets said sensed temperature to determine the amount of electrical signal to send to said electrical coil in response to said sensed engine operating condition to maintain said engine in a desired operating range.

10. A method for controlling the output speed of an electronically controlled viscous fan drive to control the temperature of a internal combustion engine within a desired operating range at a given input speed, the fan drive having a working chamber defined between an input coupling member and an output member, the method comprising:

coupling an accumulator to an input coupling assembly of the electronically controlled viscous fan drive, said accumulator having a low pressure fill hole and a high pressure fill hole, wherein said accumulator and input coupling member also define a fluid reservoir chamber, wherein said fluid reservoir chamber is fluidically coupled to the working chamber through said low pressure fill hole and said high pressure fill hole;

coupling said input coupling assembly to an actuator shaft;

coupling a valve disk to said actuator shaft within said fluid reservoir chamber;

coupling a spring around said actuator shaft between an actuator piston and said valve disk;

coupling said actuator piston to an actuator, said actuator piston capable of moving actually along the length of said input coupling assembly away from said spring in response to an increasing amount of strength of a magnetic flux generated from electrically activating said actuator, thereby causing said valve disk to be pulled in response to said movement of said actuator piston against said spring;

controlling the amount of said magnetic flux from said actuator to said actuator piston, thereby controlling the positioning of said valve disk to control the amount of a viscous fluid flowing from said fluid reservoir chamber to the working chamber, which in turn controls the amount of slippage between said input coupling member and output member within said working chamber to drive the output member.

11. The method of claim 10, wherein said spring is naturally biased against said valve disk in the absence of said magnetic flux from said actuator such that said valve disk is in a filly engaged position, said fully engaged position characterized by said valve disk being positioned such that said low pressure fill hole and said high pressure fill hole are uncovered, thereby allowing the maximum flow of said viscous fluid from said fluid reservoir chamber to the working chamber at the given input speed.

12. The method of claim 11, wherein said actuator piston moves said valve disk from said fully engaged position to a disengaged position in response to a first magnetic flux from said actuator such that said valve disk covers said high pressure fill hole and said low pressure fill hole, thereby preventing the flow of said viscous fluid from said fluid reservoir chamber to the working chamber at the given input speed.

13. The method of claim 11, wherein said actuator piston moves said valve disk from said fully engaged position to a partially engaged position in response to a first magnetic flux from said actuator, said partially engaged position therein restricting, but not preventing, the flow of said viscous fluid from said fluid reservoir chamber to said working chamber at a given input speed.

14. The method of claim 13, wherein said actuator piston moves said valve disk from said partially engaged positioned to a disengaged position in response to a second magnetic flux, said second magnetic flux being greater than the amount of said first magnetic flux, such that said valve disk covers said high pressure fill hole and said low pressure fill hole, thereby preventing the flow of said viscous fluid from said fluid reservoir chamber to the working chamber at the given input speed.

15. The method of claim 13, wherein said actuator piston moves said valve disk from said partially engaged positioned to a fully engaged position in response to a second magnetic flux, said second magnetic flux being less than the amount than said first magnetic flux, said fully engaged position characterized by said valve disk being positioned such that said low pressure fill hole and said high pressure fill hole are uncovered, thereby allowing the maximum flow of said viscous fluid from said fluid reservoir chamber to the working chamber at the given input speed.

16. The method of claim 10, wherein coupling said actuator piston to an actuator comprises:
    coupling said actuator piston to an actuator; and
    coupling said actuator to an external controller, said external controller electrically coupled to an electrical coil, said external controller capable of electrically activating said electrical coil, said electrical coil generating an amount of magnetic flux proportional to the degree of electrical activation, wherein the increase in the amount of magnetic flux of causes said actuator piston to move away from said spring in response to said relative increase.

17. The method of claim 16 further comprising electrically coupling at least one input sensor to said external controller, said at least one input sensor used to determine to the temperature of the internal combustion engine and send an electrical signal to said external controller as a function of said sensed temperature, wherein said external controller interprets said electrical signal to determine the amount of electrical activation of said electrical coil to maintain the internal combustion engine within a desired operating temperature range.

18. A method for preventing morning sickness in an electronically controlled viscous fan drive, the viscous fan drive the fan drive having a working chamber defined between an input coupling member and an output member, the input coupling member being coupled to and rotating about an input coupling assembly at a given input speed, the input coupling member being coupled to an actuator shaft, said output member driven as a function of the given input speed and the amount of a viscous fluid contained in the working chamber, the method comprising:
    providing an accumulator having an inner plate region, an inner circular ring having an inner top surface, an outer circular ring having an outer top surface and a pair of outer open regions;
    coupling said accumulator to the input coupling assembly of the viscous fan drive such that said inner top surface and said outer top surface are substantially sealed to said input coupling member, therein defining a fluid reservoir chamber and an anti-bleedback chamber, wherein said fluid reservoir chamber is fluidically coupled with said anti-bleedback chamber by a low pressure fill hole and by a high pressure fill hole,
    wherein the coupling also defines a fluid operating chamber between said accumulator, said input coupling member and a cover member, said fluid operating chamber fluidically coupling said pair of outer open regions of said accumulator to the working chamber;
    wherein the relative location of said pair of outer regions and said low pressure fill hole and high pressure fill hole are designed to prevent the flow of a viscous fluid from said fluid reservoir chamber to said fluid operating chamber when the given input speed is zero.

19. The method of claim 18, wherein providing an accumulator comprising molding an accumulator having an inner plate region, an inner circular ring having an inner top surface, an outer circular ring having an outer top surface and a pair of outer open regions.

20. An electronically controlled viscous fan drive used on an internal combustion engine comprising:
    an actuator capable of generating a magnetic flux;
    a housing member;
    a cover member coupled to said housing member;
    an actuator shaft coupled to said actuator and partially disposed within said housing member and said cover member
    an input coupling assembly coupled to said actuator shaft, said input coupling assembly capable of rotating at an input speed;
    an input coupling member coupled to said input coupling assembly and disposed within said housing member and said cover member, said input coupling member and said cover member defining a working chamber therebetween;
    an accumulator coupled to actuator shaft and sealed to said input coupling member, said accumulator having an inner circular ring and an outer circular ring and a plate portion, said inner circular ring and said outer circular ring defining an anti-bleedback chamber, said anti-bleedback chamber having a pair of outer regions;
    a fluid reservoir chamber defined by said inner circular ring, said plate portion, and said input coupling member, said fluid reservoir chamber in fluid communication with said working chamber;
    a pumping element coupled between said working chamber and said fluid reservoir chamber through said cover member;
    a fluid operating chamber defined by said accumulator, said cover member, and said input coupling member, said fluid operating chamber in fluid communication with said working chamber and each of said pair of outer regions;
    a low pressure fill hole contained within said inner circular ring, said low pressure fill hole capable of moving a quantity of a viscous fluid from said reservoir chamber to said anti-bleedback chamber;
    a high pressure fill hole contained within said inner circular ring, said high pressure fill hole capable of moving a quantity of said viscous fluid from said reservoir chamber to said anti-bleedback chamber;
    a two-piece valve disk coupled to said actuator shaft and disposed within said fluid reservoir chamber, said two-piece valve disk having an inner disk and an outer disk;

an actuator piston coupled around a portion of said actuator shaft, said actuator piston capable of axial movement along the length of said input coupling assembly in response to said nagnetic flux to position said two piece valve disk in either an engaged position, a partially engaged position, or in a disengaged position; and a spring coupled to said actuator shaft and to said inner disk such that said spring is between said inner disk and said actuator piston, said spring normally biasing said inner disk in said engaged position in the absence of said magnetic flux of said actuator.

21. The fan drive of claim 20, wherein said accumulator comprises a molded plastic accumulator.

22. The fan drive of claim 20, wherein said engaged position is characterized such that said inner disk is positioned wherein said low pressure fill hole is not covered and wherein said high pressure fill hole is not covered by said outer disk.

23. The fan drive of claim 20, wherein said partially engaged position is characterized such that said low pressure fill hole is not covered by said inner disk and such that said high pressure fill hole is partially covered by said outer disk.

24. The fan drive of claim 20, wherein said partially engaged position is characterized such that said low pressure fill hole is not covered by said inner disk and such that said high pressure fill hole is covered by said outer disk.

25. The fan drive of claim 20, wherein said partially engaged position is characterized such that said low pressure fill hole is partially covered by said inner disk and such that said high pressure fill hole is covered by said outer disk.

26. The fan drive of claim 20, wherein said disengaged position is characterized such that said low pressure fill hole is covered by said inner disk and such that said high pressure fill hole is covered by said outer disk.

27. The fan drive of claim 20, further comprising:

an external controller; and an electrical coil electrically coupled to said external controller, said electrical coil capable of being electrically activated by said external controller to generate a magnetic flux, wherein a relative increase in amount of said magnetic flux thereby causing the movement of said actuator piston away from said spring in response to said relative increase and wherein a relative decrease in said amount of magnetic flux causes the movement of said actuator piston towards said spring in response to said relative decrease.

28. The fan drive of claim 27 further comprising at least one sensor input electrically coupled to said external controller, said at least one sensor input capable of sensing the temperature of the internal combustion engine, wherein said controller interprets said sensed temperature to determine the amount of electrical signal to send to said electrical coil in response to said sensed engine operating condition to maintain said engine in a desired operating range.

* * * * *